United States Patent

[11] 3,599,236

| | | | | |
|---|---|---|---|---|
| [72] | Inventor | Roy Hutchins Redhill, England | 3,308,362 3/1967 Neumann et al. | 318/193 X |
| [21] | Appl. No. | 837,859 | 3,350,613 10/1967 Brockman et al. | 318/193 X |
| [22] | Filed | June 30, 1969 | 3,381,196 4/1968 LaRose | 318/193 X |
| [45] | Patented | Aug. 10, 1971 | 3,405,338 10/1968 Frola | 318/193 X |
| [73] | Assignee | Associated Electrical Industries Limited London, England | | |
| [32] | Priority | July 4, 1968 | | |
| [33] | | Great Britain | | |
| [31] | | 32,050/68 | | |

Primary Examiner—Benjamin Dobeck
Assistant Examiner—Gene Z. Rubinson
Attorney—Larson, Taylor and Hinds

[54] CONTROL OF SYNCHRONOUS DYNAMO-ELECTRIC MACHINES
3 Claims, 4 Drawing Figs.

[52] U.S. Cl............................................. 318/176,
318/181, 318/183, 318/193
[51] Int. Cl............................................. H02p 1/50
[50] Field of Search.................................. 318/167, 174, 176, 181, 183, 193

[56] References Cited
UNITED STATES PATENTS
3,100,279 8/1963 Rohner.................. 318/193 X ABSTRACT: An electronic circuit arrangement for connecting the DC excitation to a synchronous machine near the beginning of a positive half-cycle of its slip-frequency voltage when the speed is found to be sufficient by timing the preceding negative half-cycle. Resistance-capacitance timing means energized by an auxiliary voltage source and reset by a transistor switched on by the positive half-cycles. Transistor trigger means switched on by a combination of positive slip-frequency voltage (or the auxiliary voltage if the machine has already pulled into synchronism) and sufficient voltage from the timing means. A brushless machine construction employs solid-state devices including an SCR switch fired by the circuit arrangement.

CONTROL OF SYNCHRONOUS DYNAMO-ELECTRIC MACHINES

This invention relates to the control of synchronous alternating-current dynamo-electric machines.

According to the invention, an electronic circuit arrangement for controlling the connection of a source of direct current excitation to a field winding of a synchronous alternating current dynamo-electric machine, which winding produces an alternating slip-frequency voltage during a synchronous running of the machine, comprises;

electronic trigger means responsive to the slip-frequency voltage and an electrical enabling signal (or the absence of an electrical inhibiting signal) to produce an electrical trigger signal for initiating the connection of the excitation source to the field winding when the enabling signal is present (or the inhibiting signal is absent) and when at the same time the polarity of the slip-frequency voltage corresponds to a current induced in the field winding in the same direction as the current to be established therein by the excitation, and resettable electrical timing means for producing the enabling signal (or removing the inhibiting signal) after a predetermined period of time from termination of each resetting of the timing means, if not reset again before the end of such period, and arranged for resetting in response to the slip-frequency voltage when of said polarity but with a delay permitting the aforesaid response of the trigger means. The predetermined period is so chosen that the production of the enabling signal (or the removal of the inhibiting signal) is prevented when the machine speed is below a predetermined minimum for application of the excitation to the field winding, the slip frequency then being such that the timing means is reset before it can produce the enabling signal (or remove the inhibiting signal).

The circuit arrangement may include auxiliary-voltage means for producing a unidirectional voltage to energize the timing means in the absence of slip-frequency voltage from the field winding, the trigger means being arranged to be then responsive to this voltage, so that the circuit arrangement will initiate the connection of the excitation source to the field winding even if the machine has pulled into synchronism before this connection has been effected, as could happen with a synchronous motor started on no load. The auxiliary-voltage means may be arranged to derive the unidirectional voltage from the excitation source or from the slip-frequency voltage or both. At least where the slip-frequency voltage alone is utilized for this purpose the auxiliary-voltage means should include means (such as reservoir capacitance, preferably shunted by voltage-reference means such as a zener diode) for maintaining the unidirectional voltage, in the absence of slip-frequency voltage, at a sufficient level for energizing the timing means and the trigger means until the latter has responded as aforesaid.

Preferably, in order to achieve a brushless machine construction, the circuit arrangement is constituted by solid-state electronic devices and other components suitable for mounting on the machine rotor carrying the field winding, and is combined with solid-state electronic switching means responsive to the trigger signal (or a signal produced by solid-state electronic amplifying means in response to the trigger signal) for connecting to the field winding an excitation source which comprises an alternating current generator having its rotor coupled to or integral with that of the synchronous machine and a rotor-mounted solid-state rectifier arrangement.

An embodiment of the invention will now be described, by way of example, with reference to the accompanying drawings of which:

Figure 1:
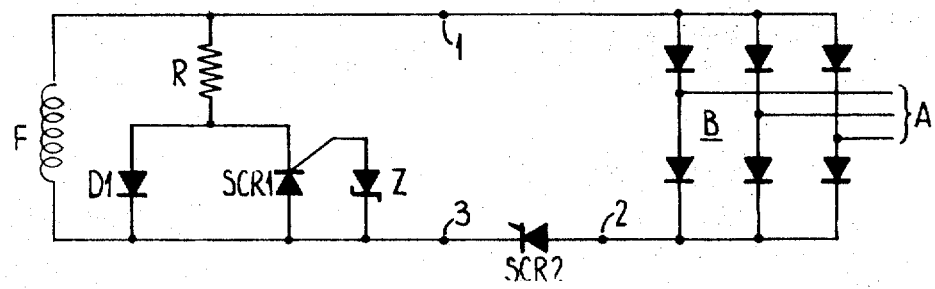
FIG. 1 is a circuit diagram of the rotor power circuit of a brushless synchronous dynamo-electric machine.
Figure 3:
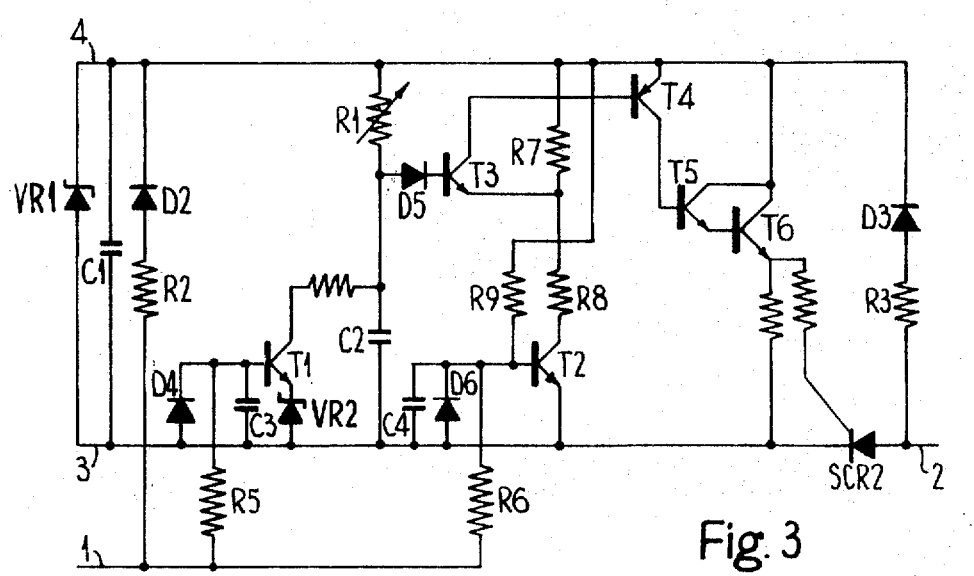
FIG. 3 is a circuit diagram of a practical form of the circuit arrangement represented by FIG. 2.
Figure 4:
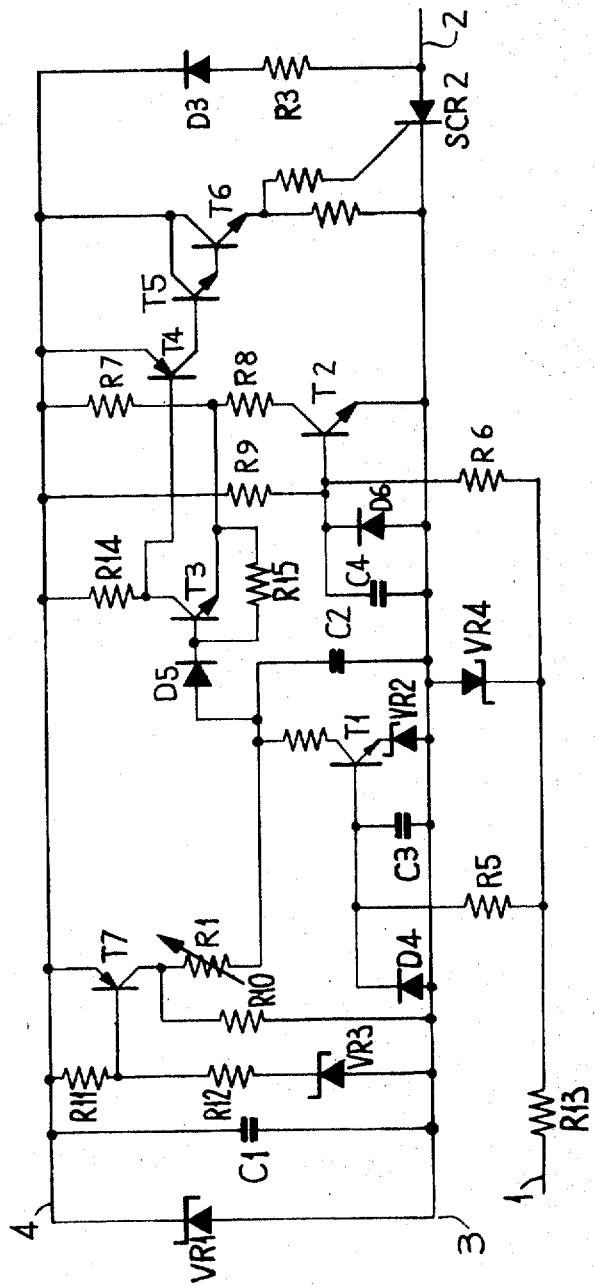
FIG. 4 is a circuit diagram of a modified circuit arrangement.

Referring first to FIG. 1, the rotor power circuit comprises a main field winding F on the rotor of a synchronous alternating current dynamo-electric machine, having one end connected to the negative side of a three-phase full-wave bridge rectifier arrangement B: this connection is designated "point 1" for the purposes of this description. The positive side of the bridge B is connected to the anode of a thyristor SCR2, this connection being designated "point 2." The cathode of this main thyristor is connected to the other end of the field winding F, this connection being designated "point 3." Alternating current connections A to the bridge B are taken to the rotor of an alternating current exciter (not shown) which is coupled to the synchronous machine rotor. The circuit components shown in FIG. 1 and the associated control circuit arrangement FIG. 3 or 4 are mounted on one or other of the rotors, or some on one of the rotors and others on the other, so that they rotate with the rotors and the connections between the synchronous machine and the exciter are brushless.

Across the field winding F between points 1 and 3 there is connected a field-discharge arrangement comprising a field-discharge resistance R in series with an antiparallel-connected combination of a diode D1 and a thyristor SCR1. The cathode of the diode and the anode of this thyristor are connected to point 3, as is the cathode of a zener diode Z whose anode is connected to the gate electrode of this thyristor. During a synchronous running of the machine an alternating voltage at slip-frequency is produced in the field winding F; this occurs during starting of the machine prior to firing of thyristor SCR2 to complete the excitation circuit and can also occur in the event of the machine pulling out of synchronism (due, for example, to a temporary overload) to such an extent that excessive back-e.m.f. in the field winding F reduces the excitation current to zero so that the thyristor SCR2 turns off. The field-discharge arrangement is such as to limit the voltage produced by the field winding F, particularly whilst the machine has a high slip frequency, by providing a current path through the resistance R. The diode D1 conducts when point 1 is positive with respect to point 3 and blocks when the opposite polarity obtains. The field-discharge thyristor SCR1 becomes conductive only when this opposite-polarity voltage has risen to a value exceeding the breakdown voltage of the zener diode Z. The latter is chosen to have such a breakdown voltage that the thyristor SCR1 remains in forward blocking state while the field-winding voltage is limited to the voltage delivered by the excitation source rectifier bridge B, as in normal synchronous running and during synchronizing of the machine.

During a normal starting operation or a resynchronizing operation after a pullout, synchronizing is achieved by firing thyristor SCR2 when the machine speed has attained a predetermined minimum such that the machine will pull into synchronism without interruption to the excitation current supplied through this thyristor. To this end, the firing of the thyristor is arranged to take place when the polarity of the slip-frequency voltage is positive, i.e. point 1 is positive with respect to point 3, so that the application of excitation will cause the current in the field winding F to continue in the direction in which it is already flowing and will reverse the polarity of points 1 and 3 so that the discharge current through the diode D1 will cease.

Figure 2:
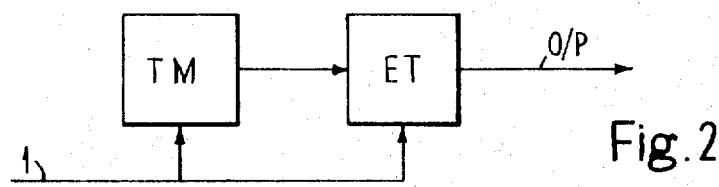
FIG. 2 is a block schematic diagram of a circuit arrangement for firing a thyristor shown in FIG. 1.

Referring to FIG. 2, the firing of thyristor SCR2 at the desired moment is achieved by electronic trigger means ET which is arranged to produce an electrical trigger signal at an output O/P when supplied with a positive voltage from point 1, provided that at the same time it is supplied with an electrical enabling signal, or has removed from it an electrical inhibiting signal, produced by resettable electrical timing means TM. The trigger signal may be such as to be supplied to the gate of the thyristor directly; alternatively, as in the FIG. 3 and FIG. 4 arrangements, it may be supplied to electronic amplifying means for firing the thyristor. The timing means TM is arranged to produce the enabling signal, or to remove the inhibiting signal, after a predetermined period of time from termination of each resetting thereof, if not reset again before the end of such period; it is arranged to reset when supplied with a positive voltage from point 1 but with a short delay to ensure that the field-discharge thyristor SCR1 has turned fully off and the trigger means has had time to respond to the enabling signal if present or to the absence of the inhibiting signal. The trigger means ET may be regarded as a device for examining the time indication reaching it from the timer TM during each positive half-cycle of the slip-frequency voltage and for initiating the connection of the excitation source B to the field winding F if this examination reveals that the preceding negative half-cycle of the slip-frequency voltage has endured for a period of time, for which the timer TM is set, equal to or longer than the duration of each half-cycle with the machine running at a predetermined minimum speed for application of the excitation to the field winding.

Referring now to FIG. 3, the practical form of the circuit arrangement there shown includes auxiliary-voltage means comprising a reservoir capacitor C1 connected in parallel with a voltage-reference zener diode VR1 between point 3 and a point 4 which, due to the polarity of the voltage-reference diode and arrangements for charging the capacitor, has a substantially constant positive voltage with respect to point 3 while the main thyristor SCR2 is nonconductive. The capacitor-charging arrangements, connected to point 4, comprise diodes D2 and D3 which are connected, with appropriate polarity, through respective current-limiting resistors R2 and R3 to point 1 and point 2 respectively. Thus the unidirectional voltage between points 4 and 3 is normally derived from positive half-cycles of slip-frequency voltage at point 1, but, in the absence of such positive voltage, the unidirectional voltage is maintained from the voltage of the excitation source at point 2, the exciter being capable of supplying sufficient power through the resistor R3 to keep the electronic circuits energized until the main thyristor SCR2 is fired.

The FIG. 2 timing means TM is constituted in the FIG. 3 arrangement by a variable resistor R1 in series with a capacitor C2 across the auxiliary supply 4–3, together with an NPN transistor T1 connected for discharging this capacitor when the transistor is rendered conductive by a positive bias applied to its base through a resistor R5 from point 1. A diode D4 and a capacitor C3 are connected in parallel between the transistor's base and emitter: the capacitor C3 is such as to provide a short time-delay in the response of this transistor to positive half-cycles of slip-frequency voltage at point 1, to ensure that the field-discharge thyristor has turned fully off and that the trigger means ET has had time to respond and maintain the firing signal of the main thyristor SCR2 for long enough to allow the excitation current to build up to the thyristor's latching current, before the timing means TM is reset by discharging of its capacitor C2; the diode D4 is poled to prevent buildup of charge on the capacitor during negative half-cycles. The emitter of the transistor T1 is connected to point 3 via a zener diode VR2 such as to prevent discharging of the timing means capacitor C2 under the influence of spurious voltage signals of short duration at points 1 and 3.

The electronic trigger means ET is constituted by NPN transistors T3 and T2 and associated circuit components. The base of transistor T3 is connected to the junction of the timing means resistor R1 and capacitor C2 through a diode D5 poled to permit the flow of base current but to prevent excessive reverse voltage appearing across the base-emitter junction. The emitter of transistor T3 is connected through a resistor R7 to point 4 and through another resistor R8 to the collector of transistor T2 whose emitter is connected to point 3. The values of these resistors R7 and R8 are such that, when transistor T2 is rendered conductive by a positive bias applied to its base through a resistor R6 from point 1 or, in the absence of inhibiting negative voltage at point 1 through a resistor R9 from point 4, a predetermined potential with respect to point 4 will be applied to the emitter of transistor T3. This potential is such that transistor T3 will then produce a trigger signal output to amplifying means constituted by NPN transistor T4 and NPN transistors T5 and T6 and associated components, if the potential at its base is higher than the emitter potential and therefore constitutes an enabling signal by which transistor T3 is biassed into conduction. The time constant of the timing means resistor R1 and capacitor C2 is so chosen that such an enabling signal is produced, or, from another point of view, the potential at the anode of diode D5 rises to a value at which it ceases to be an inhibiting signal, after a predetermined period of charging of the capacitor through the resistor from the auxiliary-voltage supply, the period being that corresponding to the duration of a half-cycle of slip-frequency voltage at the aforementioned minimum speed of the machine. The variable resistor R1 is adjusted to select the required period corresponding to the slip frequency at which the thyristor SCR2 is to be triggered; it can also be adjusted to compensate for any discrepancy between the instants at which a negative half-cycle and a charging of the capacitor commence.

Like transistor T1, transistor T2 has a diode D6 and a capacitor C4 connected in parallel between its base and its emitter to ensure that the trigger means does not respond before the field-discharge thyristor SCR1 has turned fully off and that charge does not build up on this capacitor during negative half-cycles of voltage at point 1. The time constant of the C–R circuit constituted by capacitor C3 and resistors R5, R6 and R9 in series must, of course, be such as to prevent response of transistor T1 and consequent resetting of the timing means prior to response of the trigger means in the absence of slip-frequency voltage on account of the machine having pulled into synchronism before the excitation has been applied to its field winding.

The amplifying means, constituted by transistors T4, T5 and T6 and associated components connected as shown, respond to a trigger signal output from transistor T3 to supply a firing signal to the gate of the main thyristor SCR2 which then becomes conductive to connect the excitation source B to the field winding F. The excitation voltage causes the current in the field winding to continue in the same direction and reverses the voltage between points 1 and 3 so that the discharge current through resistor R and diode D1, FIG. 1, ceases and reversal of this current is prevented by the blocking action of diode D1 and thyristor SCR1 at the excitation voltage. The control circuit is deenergized owing to the short circuit established between points 2 and 3 by the main thyristor SCR2. In the event of the machine subsequently pulling out of synchronism and causing the main thyristor SCR2 to turn off, the auxiliary-voltage supply will be reestablished ready to carry out a similar timing and thyristor-firing operation for resynchronization.

The circuit arrangement which has been described is an example of a variety of circuits which can be provided to operate on similar principles. It would be possible to modify the circuit described by omitting one of the paths for charging the auxiliary supply capacitor C1—preferably the path comprising diode D2 and resistor R2 from point 1, the arrangement being then made suitable for energization from the excitation source alone.

The circuit described can, moreover, be improved by adding a transistor to switch off the supply to the timing means resistor R1 if the auxiliary supply capacitor C1 is insufficiently charged, so that the circuit arrangement does not attempt to operate at low voltage: the purpose of this modification is to ensure that the capacitor has sufficient stored energy to maintain the firing signal for long enough to enable the excitation current to rise to the "latching" value at which the thyristor SCR2 will continue to conduct when the firing signal ceases. A modification of the FIG. 3 circuit arrangement, incorporating this and other improvements, is illustrated in FIG. 4 of the accompanying drawings. It differs from the FIG. 3 arrangement only in the following respects.

A PNP transistor T7 is interposed between the timing means resistance R1 and the positive side of the auxiliary supply, its emitter being connected to point 4 and its collector to R1. A collector load resistor R10 is connected between the collector and the negative side of the auxiliary supply at point 3. The base of T7 is connected to point 4 through a resistor R11 and to point 3 through a resistor R12 and a zener diode VR3 in series. The values of these two resistors and the polarity and breakdown voltage of this zener diode are so chosen that the transistor T7 will have sufficient base-emitter negative bias to make it conductive when the auxiliary supply voltage is sufficient for proper operation of the rest of the circuit, but that this bias will be blocked by the zener diode VR3 whenever this voltage is too low. In the latter circumstances the transistor T7 will not conduct and, consequently, the timing means R1—C2 will not operate.

The slip-frequency voltage feed to the reservoir capacitor C1 through resistor R2 and diode D2, FIG. 3, is omitted. A resistor R13 is interposed between point 1 and the junction of resistors R5 and R6 to limit the current which can flow through a zener diode VR4 which, connected between this junction and point 3, is such as to protect transistors T1 and T2 from excessive voltage between points 1 and 3 and to reduce the effect of voltage variations in the timing signal across points 1 and 3.

I claim:

1. A synchronous alternating-current dynamo-electric machine comprising a field winding for producing an alternating slip-frequency voltage during a synchronous running of the machine; a source of direct current excitation; a field switch connected between said source and the field winding; and a control circuit for controlling said field switch and comprising: resetting means switchable between a resetting condition and a normal condition responsive to the slip-frequency voltage connected to the field winding, said resetting means being switched into the resetting condition by said slip-frequency voltage, with predetermined delay, when the slip-frequency voltage is of a polarity corresponding to a current induced in the field winding in the same direction as the current required to be established therein by said source of direct current excitation during synchronous running, and into the normal condition when the slip-frequency voltage is of the opposite polarity; timing means connected to the resetting means, and actuated responsive to the state of said resetting means said timing means being held by the resetting means in a reset condition for the resetting condition of said resetting means and completing a timing cycle for the normal condition of said resetting means to produce at the output thereof an enabling signal after a predetermined period from the beginning of the timing cycle if not reset again before the end of said period, said enabling signal being produced until the timing means is set again; a phase switch connected to the field winding and switchable between first and second conditions responsive to the slip-frequency voltage, said phase switch being switched into the first condition when the slip-frequency voltage is of said polarity, and the second condition when the slip-frequency voltage is of said opposite polarity; and trigger means connected directly with the output of said timing means and with said phase switch for producing a trigger signal when the enabling signal is present and at the same time the phase switch is in said first condition, said trigger signal being applied to said field switch to initiate the connection of the source of direct current excitation to the field winding.

2. A circuit arrangement as claimed in claim 1 including auxiliary-voltage means for producing a unidirectional voltage, said auxiliary-voltage means being connected with the field winding for deriving said unidirectional voltage from the slip-frequency voltage and with the source of direct current excitation for deriving said unidirectional voltage from said source when the slip-frequency voltage is absent or insufficient for this purpose, and connected with the timing means for applying said unidirectional voltage thereto to energize the timing means in the absence of slip-frequency voltage from the field winding.

3. A circuit arrangement as claimed in claim 2, includes means for preventing energization of the timing means if the magnitude of said unidirectional voltage is below a predetermined value.